(12) United States Patent
Hara et al.

(10) Patent No.: US 11,649,003 B2
(45) Date of Patent: May 16, 2023

(54) HUMAN-POWERED VEHICLE CONTROL DEVICE

(71) Applicant: Shimano Inc., Osaka (JP)

(72) Inventors: Nobukatsu Hara, Osaka (JP); Satoshi Shahana, Osaka (JP); Yuta Mizutani, Osaka (JP)

(73) Assignee: Shimano Inc., Osaka (JP)

( * ) Notice: Subject to any disclaimer, the term of this patent is extended or adjusted under 35 U.S.C. 154(b) by 323 days.

(21) Appl. No.: 17/029,603

(22) Filed: Sep. 23, 2020

(65) Prior Publication Data

US 2021/0107581 A1 Apr. 15, 2021

(30) Foreign Application Priority Data

Oct. 9, 2019 (JP) ............................. JP2019-186224

(51) Int. Cl.
| | |
|---|---|
| *B62J 1/08* | (2006.01) |
| *B62M 1/36* | (2013.01) |
| *B62J 45/415* | (2020.01) |
| *B62J 45/421* | (2020.01) |
| *B62J 45/411* | (2020.01) |
| *B62J 45/412* | (2020.01) |

(52) U.S. Cl.
CPC ............ *B62J 1/08* (2013.01); *B62J 45/411* (2020.02); *B62J 45/412* (2020.02); *B62J 45/4152* (2020.02); *B62J 45/421* (2020.02); *B62M 1/36* (2013.01); *B62J 2001/085* (2013.01)

(58) Field of Classification Search
CPC ................................................ B62J 2001/085
See application file for complete search history.

(56) References Cited

U.S. PATENT DOCUMENTS

| | | | |
|---|---|---|---|
| 9,422,018 B2 | 8/2016 | Pelot et al. | |
| 9,592,882 B2 | 3/2017 | Butora et al. | |
| 2016/0304146 A1 | 10/2016 | Teixeira et al. | |
| 2018/0105222 A1* | 4/2018 | Tepass | B62K 19/36 |
| 2020/0247498 A1* | 8/2020 | Yamamoto | B62J 45/411 |
| 2021/0276660 A1* | 9/2021 | Takayama | B62L 3/00 |
| 2021/0331766 A1* | 10/2021 | Rizzo | B62M 25/08 |
| 2021/0371028 A1* | 12/2021 | Coaplen | B62J 1/08 |

FOREIGN PATENT DOCUMENTS

| | | | | |
|---|---|---|---|---|
| DE | 202011103073 U1 | * | 11/2011 | ............ B62K 19/36 |
| DE | 102019006320 B3 | * | 10/2020 | |
| DE | 202019003346 U1 | * | 11/2020 | |
| DE | 102020004649 A1 | * | 1/2022 | |
| DE | 102021111565 A1 | * | 4/2022 | |
| KR | 20220003089 A | * | 1/2022 | |
| KR | 20220119245 A | * | 8/2022 | |

* cited by examiner

*Primary Examiner* — Timothy J Brindley
(74) *Attorney, Agent, or Firm* — Global IP Counselors, LLP

(57) ABSTRACT

A control device including an electronic controller for controlling a human-powered vehicle. The electronic controller is configured to control an adjusting device that is configured to adjust a seat height of the human-powered vehicle upon determining the human-powered vehicle is being stopped while traveling uphill.

12 Claims, 5 Drawing Sheets

HUMAN-POWERED VEHICLE CONTROL DEVICE

CROSS-REFERENCE TO RELATED APPLICATIONS

This application claims priority to Japanese Patent Application No. 2019-186224, filed on Oct. 9, 2019. The entire disclosure of Japanese Patent Application No. 2019-186224 is hereby incorporated herein by reference.

BACKGROUND

Technical Field

The present invention generally relates to a human-powered vehicle control device.

Background Information

Some human-powered vehicle are provided with an adjusting device that adjusts a seat height. For example, U.S. Pat. No. 9,422,018 (Patent Document 1) discloses a human-powered vehicle including an adjusting device that adjusts a seat height.

SUMMARY

One object of the present disclosure is to provide a human-powered vehicle control device that adjusts the seat height in accordance with a traveling state.

A control device in accordance with a first aspect of the present disclosure is for a human-powered vehicle. The control device comprises an electronic controller configured to control an adjusting device that is configured to adjust a seat height of the human-powered vehicle upon determining the human-powered vehicle is stopped on an uphill in an uphill facing direction.

The control device according to the first aspect adjusts the seat height to be suitable for a case where the human-powered vehicle is being stopped while traveling uphill.

In accordance with a second aspect of the present disclosure, the control device according to the first aspect is configured so that the electronic controller is configured to control the adjusting device to adjust the seat height from a first seat height to a second seat height that differs from the first seat height upon determining the human-powered vehicle is being stopped while traveling uphill where the seat height is the first seat height.

The control device according to the second aspect adjusts the seat height to the second seat height in a case where the human-powered vehicle is being stopped while traveling uphill.

In accordance with a third aspect of the present disclosure, the control device according to the second aspect is configured so that the first seat height is higher than the second seat height.

The control device according to the third aspect lowers the seat height in a case where the human-powered vehicle is being stopped while traveling uphill.

In accordance with a fourth aspect of the present disclosure, the control device according to the second or third aspect is configured so that the electronic controller is configured to control the adjusting device to adjust the seat height of the human-powered vehicle to the second seat height upon determining the human-powered vehicle is being stopped while traveling uphill where the seat height is the first seat height, and the electronic controller then is configured to control the adjusting device to adjust the seat height of the human-powered vehicle to the first seat height in upon the electronic controller determining that a traveling state of the human-powered vehicle is a first state.

The control device according to the fourth aspect adjusts the seat height to the first seat height in a case where the traveling state of the human-powered vehicle becomes the first state.

In accordance with a fifth aspect of the present disclosure, the control device according to the fourth aspect is configured so that the electronic controller is configured to determine that the traveling state of the human-powered vehicle is the first state where a change amount of at least one of a vehicle speed of the human-powered vehicle, a cadence of the human-powered vehicle, and a depression force input to the human-powered vehicle is less than or equal to a predetermined change amount.

The control device according to the fifth aspect adjusts the seat height to the first seat height in a case where the change amount of at least one of a vehicle speed of the human-powered vehicle, a cadence of the human-powered vehicle, and a depression force input to the human-powered vehicle is less than or equal to the predetermined change amount.

In accordance with a sixth aspect of the present disclosure, the control device according to the second or third aspect is configured so that the electronic controller is configured to control the adjusting device to adjust the seat height of the human-powered vehicle to the second seat height upon determining the human-powered vehicle is being stopped while traveling uphill where the seat height is the first seat height, and the electronic controller then is configured to control the adjusting device to adjust the seat height of the human-powered vehicle to the first seat height upon the electronic controller determining that a traveling state of the human-powered vehicle is a second state.

The control device according to the sixth aspect adjusts the seat height to the first seat height in a case where the traveling state of the human-powered vehicle becomes the second state.

In accordance with a seventh aspect of the present disclosure, the control device according to the sixth aspect is configured so that the electronic controller is configured to determine that the traveling state of the human-powered vehicle is the second state upon the electronic controller detecting at least one of a rotation of a crank of the human-powered vehicle and an input of a depression force to the human-powered vehicle.

The control device according to the seventh aspect determines the second state in accordance with at least one of a rotation of the crank of the human-powered vehicle and an input of depression force to the human-powered vehicle.

In accordance with an eighth aspect of the present disclosure, the control device according to the sixth or seventh aspect is configured so that the electronic controller is configured to control the adjusting device to adjust the seat height of the human-powered vehicle to the second height upon the electronic controller determining that the traveling state of the human-powered vehicle is a third state after determining that the traveling state of the human-powered vehicle is the second state.

The control device according to the eighth aspect adjusts the seat height to the second seat height in a case where the traveling state of the human-powered vehicle becomes the third state.

In accordance with a ninth aspect of the present disclosure, the control device according to the eighth aspect is configured so that the electronic controller is configured to determine that the traveling state of the human-powered vehicle is the third state upon determining a rotational speed of a rear wheel of the human-powered vehicle is higher than a rotational speed of a front wheel of the human-powered vehicle by a predetermined speed or greater.

The control device according to the ninth aspect adjusts the seat height to the second seat height in a case where the rotational speed of the rear wheel of the human-powered vehicle is higher than the rotational speed of the front wheel of the human-powered vehicle by the predetermined speed or greater.

In accordance with a tenth aspect of the present disclosure, the control device according to any one of the second to ninth aspects is configured so that the adjusting device includes an actuator. Further, the electronic controller is configured to transmit a first seat height control signal to the adjusting device to actuate the actuator so that the seat height of the human-powered vehicle becomes the first seat height.

The control device according to the tenth aspect transmits the first seat height control signal to the adjusting device to control the adjusting device so that the seat height becomes the first seat height.

In accordance with an eleventh aspect of the present disclosure, the control device according to any one of the second to tenth aspects is configured so that the adjusting device includes an actuator. Further, the electronic controller is configured to transmit a second seat height control signal to the adjusting device to actuate the actuator so that the seat height of the human-powered vehicle becomes the second seat height.

The control device according to the eleventh aspect transmits the second seat height control signal to the adjusting device to control the adjusting device so that the seat height becomes the second seat height.

In accordance with a twelfth aspect of the present disclosure, the control device according to any one of the first to eleventh aspects is configured so that the electronic controller is configured to determine that the human-powered vehicle is stopped on the uphill in the uphill facing direction based on traveling information of the human-powered vehicle. The traveling information includes at least one of an inclination with respect to a pitch direction of the human-powered vehicle, a load on a front wheel support axle, a load on a rear wheel support axle, an input depression force, vehicle speed, a rotational speed of a front wheel, a rotational speed of a rear wheel, a cadence of a rider, and a seated state of the rider.

The control device according to the twelfth aspect determines that the human-powered vehicle is being stopped while traveling uphill in accordance with at least one of an inclination of the human-powered vehicle with respect to the pitch direction, a load on the front wheel support axle, a load on the rear wheel support axle, an input depression force, a vehicle speed, a rotational speed of the front wheel, a rotational speed of the rear wheel, a cadence of a ride, and a seated state of the rider in a preferred manner.

The human-powered vehicle control device of the present disclosure adjusts the seat height in accordance with the traveling state.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
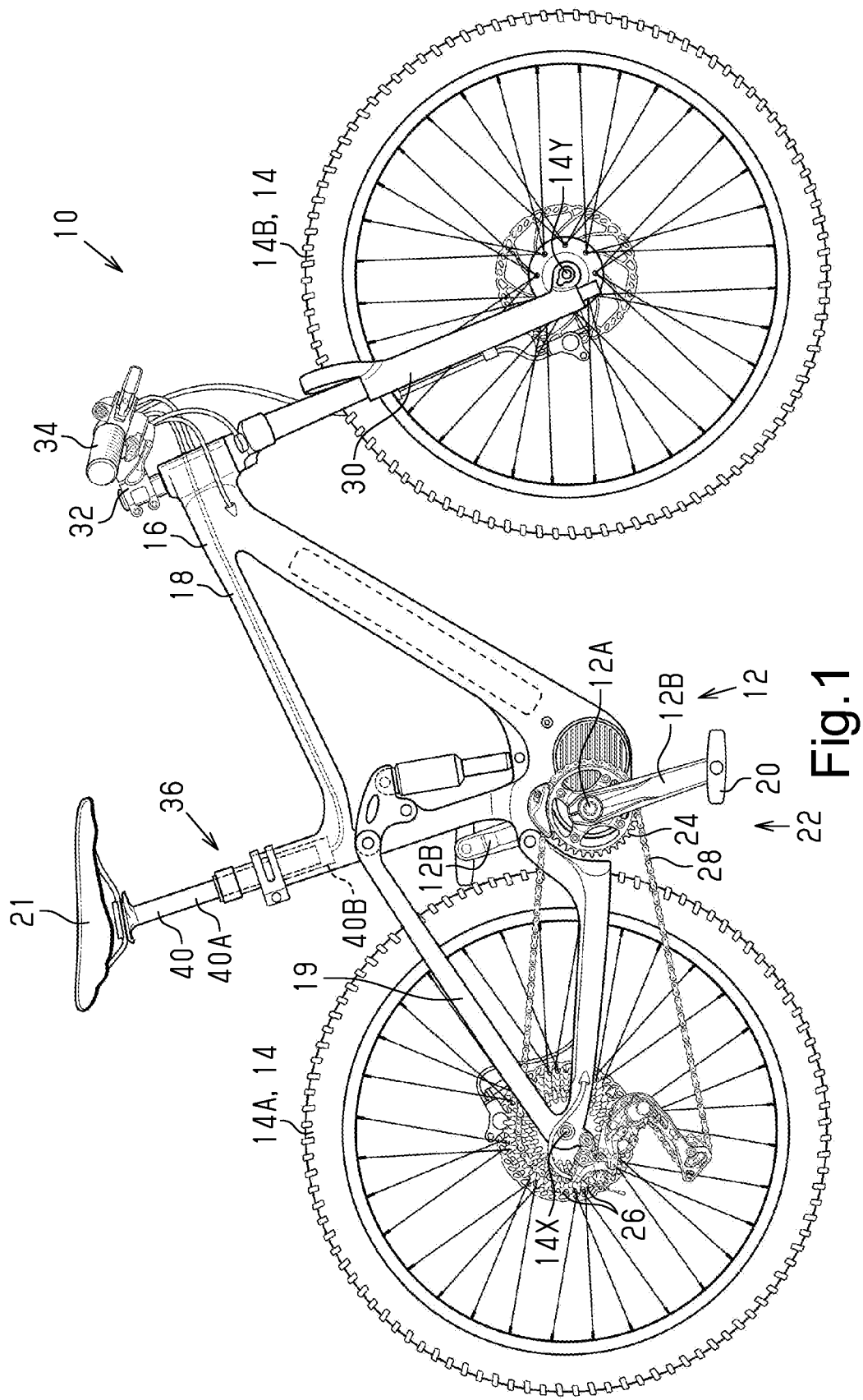
FIG. 1 is a side elevational view showing a human-powered vehicle including a human-powered vehicle control device in accordance with a first embodiment.
Figure 2:
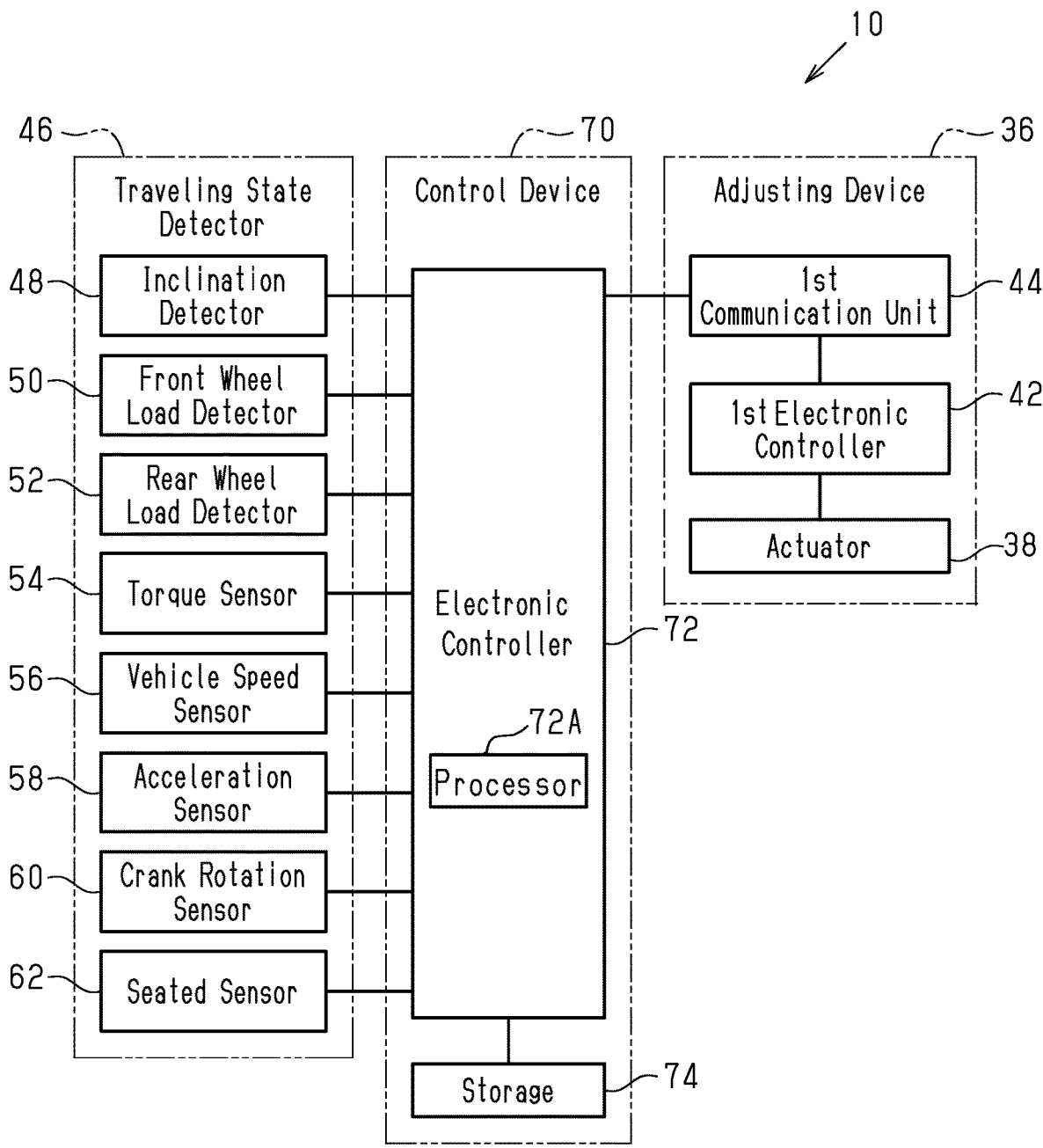
FIG. 2 is a block diagram showing the electric configuration of the human-powered vehicle control device in accordance with the first embodiment.

A control device 70 for a human-powered vehicle in accordance with a first embodiment will now be described with reference to FIGS. 1 to 3. A human-powered vehicle 10 is a vehicle that can be driven by at least human driving force. There is no limit to the number of wheels of the human-powered vehicle 10. For example, the human-powered vehicle 10 can be a unicycle or a vehicle having three or more wheels. Examples of the human-powered vehicle 10 include various types of bicycles such as a mountain bike, a road bike, a city bike, a cargo bike, and a recumbent bicycle, as well as an electric bicycle (E-bike). An electric bicycle includes an electric assist bicycle that assists in propulsion of the vehicle with an electric motor. In the embodiments described hereafter, the human-powered vehicle 10 will be referred to as a bicycle.

The human-powered vehicle 10 includes a crank 12 to which human driving force is input. The human-powered vehicle 10 further includes a wheel 14 and a vehicle body 16. Here, in the illustrated embodiment, the wheel 14 of the human-powered vehicle 10 includes a rear wheel 14A and a front wheel 14B. The vehicle body 16 includes a frame 18 and a swingarm 19 that is supported by the frame 18 in a relatively movable manner. The crank 12 includes a crank axle 12A and two crank arms 12B. The crank axle 12A is rotatably supported by the frame 18. The two crank arms 12B are respectively provided on two axial ends of the crank axle 12A. Two pedals 20 are connected to the two crank arms 12B, respectively. The rear wheel 14A is driven by the rotation of the crank 12. The rear wheel 14A is supported by the swingarm 19. The crank 12 is connected to the rear wheel 14A by a drive mechanism 22. The drive mechanism 22 includes a first rotational body 24 connected to the crank axle 12A. The crank axle 12A can be connected to the first rotational body 24 by a first one-way clutch. The first one-way clutch is configured to rotate the first rotational body 24 forward in a case where the crank 12 is rotated forward and configured not to rotate the first rotational body 24 rearward in a case where the crank 12 is rotated rearward. The first rotational body 24 includes a sprocket, a pulley, or a bevel gear. The drive mechanism 22 further includes a second rotational body 26 and a linking member 28. The linking member 28 transmits the rotational force of the first rotational body 24 to the second rotational body 26. The linking member 28 includes, for example, a chain, a belt, or a shaft.

The second rotational body 26 is connected to the rear wheel 14A. The second rotational body 26 includes a sprocket, a pulley, or a bevel gear. Preferably, a second one-way clutch is provided between the second rotational body 26 and the rear wheel 14A. The second one-way clutch is configured to rotate the rear wheel 14A in a case where the second rotational body 26 is rotated forward and configured not to rotate the rear wheel 14A rearward in a case where the second rotational body 26 is rotated rearward.

A front fork 30 is rotatably attached to the frame 18. The front wheel 14B is supported by the front fork 30. A handlebar 34 is connected to the front fork 30 by a stem 32. In the present embodiment, the rear wheel 14A is connected to the crank 12 by the drive mechanism 22. Alternatively, at least one of the rear wheel 14A and the front wheel 14B can be connected to the crank 12 by the drive mechanism 22.

An adjusting device 36 is configured to adjust a seat height P of the human-powered vehicle 10. The adjusting device 36 includes an actuator 38. The adjusting device 36 includes a seatpost 40. The seatpost 40 includes a first member 40A and a second member 40B. In a case where one of the first member 40A and the second member 40B is moved relative to the other one of the first member 40A and the second member 40B, the length of the seatpost 40 is changed and the seat height P is adjusted. The adjusting device 36 further includes a first electronic controller 42. The term "electronic controller" as used herein refers to hardware that executes a software program, and does not include a human. Hereinafter, the first electronic controller 42 will be referred to as "the first controller 42" for the sake of brevity. The first controller 42 drives the actuator 38 in accordance with a seat height control signal from an electronic controller 72 of the control device 70. The actuator 38 can be configured to directly move the first member 40A and the second member 40B relative to each other. Alternatively, the actuator 38 can be configured to switch between a state in which relative movement of the first member 40A and the second member 40B is allowed and a state in which relative movement of the first member 40A and the second member 40B is restricted. In a case where the actuator 38 is configured to switch between the state allowing relative movement of the first member 40A and the second member 40B and the state restricting relative movement of the first member 40A and the second member 40B, for example, the first member 40A and the second member 40B are moved relative to each other by circulation of air inside the adjusting device 36. The actuator 38 controls an air valve that changes a circulation state of air inside the adjusting device 36.

The first controller 42 includes at least one processor that execute predetermined control programs. Each processor includes, for example, a central processing unit (CPU) or a micro-processing unit (MPU). When the el first controller 42 has more than one processors, the processors can be located at the same location (e.g., a single printed circuit board) or at one or more separate locations. The first controller 42 can include one or more microcomputers. The first controller 42 can include a first communication unit 44 to communicate with the controller 72 of the control device 70. The first communication unit 44 is configured to perform wired or wireless communication with the controller 72. One example of wired communication is power line communication (PLC). Examples of wireless communication includes at least one of Bluetooth®, ANT+®, Wi-Fi®, and infrared communication.

The control device 70 includes the electronic controller 72 as mentioned above. Hereinafter, the electronic controller 72 will be referred to as "the controller 72" for the sake of brevity. The controller 72 includes at least one processor 72A that executes predetermined control programs. Each processor includes, for example, a CPU or MPU. When the controller 72 has more than one processors, the processors can be located at the same location (e.g., a single printed circuit board) or at one or more separate locations. The controller 72 can include one or more microcomputers.

Preferably, the control device 70 further includes storage 74. The storage 74 stores information used for various types of control programs and control processes. The storage 74 can be any a non-transitory computer readable medium. The storage 74 includes, for example, a nonvolatile memory and a volatile memory. A non-volatile memory includes, for example, at least one of a read-only memory (ROM), an erasable programmable read-only memory (EPROM), an electrically erasable programmable read-only memory (EEPROM), and a flash memory. A volatile memory includes, for example, a random access memory (RAM).

Preferably, the controller 72 is configured to transmit the seat height control signal to the adjusting device 36 to change the seat height P of the human-powered vehicle 10. The seat height control signal includes a first seat height control signal and a second seat height control signal. Preferably, the controller 72 is configured to transmit the first seat height control signal to the adjusting device 36 to actuate the actuator 38 so that the seat height P of the human-powered vehicle 10 becomes a first seat height P1. Preferably, the controller 72 is configured to transmit a second seat height control signal to the adjusting device 36 to actuate the actuator 38 so that the seat height P of the human-powered vehicle 10 becomes a second seat height P2. In a case where the first communication unit 44 receives the seat height control signal, the first controller 42 of the adjusting device 36 drives the actuator 38 so that the seat height P is in accordance with information related to the seat height P included in the seat height control signal. In a case where the first communication unit 44 receives the first seat height control signal, the first controller 42 of the adjusting device 36 drives the actuator 38 so that the seat height P becomes the first seat height P1. In a case where the first communication unit 44 receives the second seat height control signal, the first controller 42 of the adjusting device 36 drives the actuator 38 so that the seat height P becomes the second seat height P2. In a case where the actuator 38 controls the air valve, if the first communication unit 44 receives the seat height control signal that increases the seat height P from the present seat height P and no load is applied to the seatpost, the first controller 42 of the adjusting device 36 controls the air valve to increase the seat height P. In a case where the actuator 38 controls the air valve, if the first communication unit 44 receives the seat height control signal that decreases the seat height P from the present seat height P and no load is applied to the seatpost, the first controller 42 of the adjusting device 36 controls the air valve to decrease the seat height P.

The human-powered vehicle 10 can include a seat height detector that detects the seat height P. A seat height detector can be, for example, a linear encoder and a potentiometer. In a case where the first communication unit 44 receives the seat height control signal, the first controller 42 drives the actuator 38 in accordance with an output of the seat height detector. In a case where the actuator 38 is configured to directly move the first member 40A and the second member 40B relative to each other, the first controller 42 stops driving the actuator 38 if the seat height P becomes the seat height P corresponding to the received seat height control signal. In a case where the actuator 38 is configured to switch between the state allowing relative movement of the first member 40A and the second member 40B and the state restricting relative movement of the first member 40A and the second member 40B, the first controller 42 switches from the state allowing relative movement of the first member 40A and the second member 40B to the state restricting relative movement of the first member 40A and the second member 40B if the seat height P becomes the seat height P corresponding to the received seat height control signal.

Preferably, the controller 72 is configured to control the adjusting device 36 in a case where the human-powered vehicle 10 is being stopped while traveling uphill (i.e., the human-powered vehicle 10 is stopped or about to be stopped on an uphill in an uphill facing direction). Preferably, the controller 72 determines whether the human-powered vehicle 10 is being stopped while traveling uphill (i.e., the human-powered vehicle 10 is stopped or about to be stopped on an uphill in an uphill facing direction) based on traveling information of the human-powered vehicle 10. The traveling information includes at least one of an inclination D with respect to a pitch direction of the human-powered vehicle 10, a load LB on a front wheel support axle 14Y, a load LA on a rear wheel support axle 14X, an input depression force H, a vehicle speed V, a rotational speed WB of the front wheel 14B, a rotational speed WA of the rear wheel 14A, a cadence C of a rider, and a seated state of the rider.

Preferably, the controller 72 includes a traveling state detector 46. The term "detector" as used herein refers to a hardware device or instrument designed to detect the presence or absence of a particular event, object, substance, or a change in its environment, and to emit a signal in response. The term "detector" as used herein do not include a human. The traveling state detector 46 includes at least one of an inclination detector 48, a front wheel load detector 50, a rear wheel load detector 52, a torque sensor 54, a vehicle speed sensor 56, an acceleration sensor 58, a crank rotation sensor 60, and a seated sensor 62.

The inclination detector 48 at least includes, for example, an inclination sensor or a global positioning system (GPS) receiver. An inclination sensor at least includes, for example, a gyro sensor or an acceleration sensor. In a case where the inclination detector 48 includes a GPS receiver, the controller 72 stores map information including road gradient-related information in advance in the storage 74. The controller 72 obtains road gradient of the present location of the human-powered vehicle 10 as the inclination D.

The front wheel load detector 50 is, for example, located between a portion on which the front wheel support axle 14Y is provided and the front wheel support axle 14Y and detects the load LB applied to the front wheel support axle 14Y.

The rear wheel load detector 52 is, for example, located between a portion on which the rear wheel support axle 14X is provided and the rear wheel support axle 14X and detects the load LA applied to the rear wheel support axle 14X.

The torque sensor 54 is configured to output information corresponding to torque based on the depression force H input to the crank 12. The torque sensor 54 includes a torsion sensor, a magnetostrictive sensor, a pressure sensor, or the like. A torsion sensor includes a torsion gauge. The torque sensor 54 is, for example, coupled to the crank axle 12A, a member that transmits the human driving force between the crank axle 12A and the first rotational body 24, the crank arm 12B, or the pedal 20.

The vehicle speed sensor 56 is configured to detect information corresponding to rotational speed W of the wheel 14 of the human-powered vehicle 10. Preferably, the vehicle speed sensor 56 is configured to detect a magnet provided on the wheel 14 of the human-powered vehicle 10. Preferably, the vehicle speed sensor 56 is configured to output a predetermined number of detection signals whenever the wheel 14 rotates once. Preferably, the predetermined number is one. The vehicle speed sensor 56 outputs a signal corresponding to the rotational speed W of the wheel 14. The controller 72 is configured to calculate the vehicle speed V of the human-powered vehicle 10 from the rotational speed W of the wheel 14. Preferably, the vehicle speed sensor 56 includes a magnetic reed forming a reed switch or a Hall element. The vehicle speed sensor 56 can be mounted on the swingarm 19 of the frame 18 of the human-powered vehicle 10 and configured to detect a magnet mounted on the rear wheel 14A. Alternatively, the vehicle speed sensor 56 can be provided on the front fork 30 and configured to detect a magnet mounted on the front wheel 14B. In the present embodiment, the vehicle speed sensor 56 is configured so that a reed switch detects a magnet whenever the wheel 14 rotates once.

The acceleration sensor 58 detects, for example, acceleration of the human-powered vehicle 10. Preferably, the acceleration sensor 58 is configured to detect acceleration of one or more axes. Preferably, the acceleration sensor 58 is configured to detect acceleration with respect to a vertical direction.

The crank rotation sensor 60 is configured to detect information corresponding to rotational speed of the crank axle 12A of the human-powered vehicle 10. The crank rotation sensor 60 is, for example, provided on the frame 18 on the human-powered vehicle 10. The crank rotation sensor 60 includes a magnetic sensor that outputs a signal corresponding to the strength of the magnetic field. A ring-shaped magnet of which the magnetic field strength changes in a circumferential direction is provided on the crank axle 12A, a member that is rotated in cooperation with the crank axle 12A, or in the power transmission path extending from the crank axle 12A to the first rotational body 24. The crank rotation sensor 60 outputs a signal corresponding to the rotational speed of the crank axle 12A. The magnet can be provided on a member that is rotated integrally with the crank axle 12A in the power transmission path between the crank axle 12A and the first rotational body 24. The crank rotation sensor 60 can include an optical sensor, an acceleration sensor, a torque sensor, or the like instead of the magnetic sensor.

The seated sensor 62 is, for example, provided on the seatpost 40 or a seat 21 of the human-powered vehicle 10. The seated sensor 62 includes, for example, at least one of a load sensor, a pressure sensor, and a switch. The controller 72 detects whether a rider is in a seated state on the seat 21 or a non-seated state in accordance with an output of the seated sensor 62.

The controller 72 can determine that the human-powered vehicle 10 is traveling uphill, for example, using at least one of first to seventh examples. The controller 72 can determine that the human-powered vehicle 10 is traveling uphill using only one of the first to seventh examples. Alternatively, the controller 72 can determine that the human-powered vehicle 10 is traveling uphill using a combination of two or more of the first to seventh examples.

In the first example, the controller 72 determines that the human-powered vehicle 10 is traveling uphill in a case where the inclination D with respect to the pitch direction of the human-powered vehicle 10 is greater than or equal to a predetermined inclination DX. Preferably, the traveling state detector 46 includes the inclination detector 48 in the first example.

In the second example, the controller 72 determines that the human-powered vehicle 10 is traveling uphill in a case where the load LB on the front wheel support axle 14Y is less than or equal to a predetermined load LBX. Preferably, the human-powered vehicle 10 includes the front wheel load detector 50 in the second example.

In the third example, the controller 72 determines that the human-powered vehicle 10 is traveling uphill in a case where the load LA on the rear wheel support axle 14X is less than or equal to a predetermined load LAX. Preferably, the traveling state detector 46 includes the rear wheel load detector 52 in the third example.

In the fourth example, the controller 72 determines that the human-powered vehicle 10 is traveling uphill in accordance with the difference of the load LB on the front wheel support axle 14Y and the load LA on the rear wheel support axle 14X. For example, the controller 72 determines that the human-powered vehicle 10 is traveling uphill in a case where the load LB on the front wheel support axle 14Y is less than the load LA on the rear wheel support axle 14X. Preferably, the traveling state detector 46 includes the front wheel load detector 50 and the rear wheel load detector 52.

In the fifth example, the controller 72 determines that the human-powered vehicle 10 is traveling uphill in a case where upward acceleration with respect to the vertical direction detected by the acceleration sensor 58 is greater than zero. Preferably, the traveling state detector 46 includes the acceleration sensor 58 in the fifth example.

For example, in a case where the controller 72 determines that the human-powered vehicle 10 is traveling uphill in at least one of the first to fifth examples, the controller 72 can determine that the human-powered vehicle 10 is being stopped while traveling uphill (i.e., the human-powered vehicle 10 is stopped or about to be stopped on an uphill in a uphill facing direction) using a determination of at least one of sixth to twelfth examples. The controller 72 can determine that the human-powered vehicle 10 is being stopped while traveling uphill using only one of the sixth to twelfth examples. Alternatively, the controller 72 can determine that the human-powered vehicle 10 is being stopped while traveling uphill using a combination of two or more of the sixth to twelfth examples.

In the sixth example, the controller 72 determines that the human-powered vehicle 10 is stopped in a case where the depression force H is input to only one of the pedals 20. Preferably, the traveling state detector 46 includes the torque sensor 54 in the sixth example.

In the seventh example, the controller 72 determines that the human-powered vehicle 10 is stopped in a case where the vehicle speed V is lower than or equal to a predetermined vehicle speed VX. In the seventh example, the traveling state detector 46 includes the vehicle speed sensor 56. The predetermined vehicle speed VX is, for example, selected from a range greater than or equal to 0 kilometers per hour and less than or equal to 3 kilometers per hour.

In the eighth example, the controller 72 determines that the human-powered vehicle 10 is stopped in a case where the rotational speed WB of the front wheel 14B is lower than or equal to a predetermined rotational speed WBX. Preferably, the traveling state detector 46 includes the vehicle speed sensor 56 in the eighth example. The vehicle speed sensor 56 of the eighth example is, for example, provided on the front fork 30 and detects a magnet mounted on the front wheel 14B. The predetermined rotational speed WBX is, for example, selected from the rotational speed WB with which the speed multiplied by the circumferential length of a tire of the front wheel 14B becomes greater than or equal to 0 kilometers per hour and lower than or equal to 3 kilometers per hour.

In the ninth example, the controller 72 determines that the human-powered vehicle 10 is stopped in a case where the rotational speed WA of the rear wheel 14A is lower than or equal to a predetermined rotational speed WAX. Preferably, the traveling state detector 46 includes the vehicle speed sensor 56 in the ninth example. The vehicle speed sensor 56 of the ninth example is, for example, mounted on a chainstay of the frame 18 on the human-powered vehicle 10 and detect a magnet mounted on the rear wheel 14A. The predetermined rotational speed WAX is, for example, selected from the rotational speed WA with which the speed multiplied by the circumferential length of a tire of the rear wheel 14A becomes greater than or equal to 0 kilometers per hour and lower than or equal to 3 kilometers per hour.

In the tenth example, the controller 72 determines that the human-powered vehicle 10 is stopped in a case where upward acceleration with respect to the vertical direction detected by the acceleration sensor 58 is less than or equal to zero. Preferably, the traveling state detector 46 includes the acceleration sensor 58 in the tenth example.

In the eleventh example, the controller 72 determines that the human-powered vehicle 10 is stopped in a case where the cadence C of the rider is less than or equal to a predetermined cadence CX. Preferably, the traveling state detector 46 includes the crank rotation sensor 60 in the eleventh example. The predetermined cadence CX is, for example, selected from a range greater than or equal to 0 rpm and less than or equal to 10 rpm.

In the twelfth example, the controller 72 determines that the human-powered vehicle 10 is stopped in a case where the rider is not seated. Preferably, the traveling state detector 46 includes the seated sensor 62 in the twelfth example.

Preferably, if the human-powered vehicle 10 is being stopped while traveling uphill in a case where the seat height P is the first seat height P1, then the controller 72 controls the adjusting device 36 to adjust the seat height P from the first seat height P1 to the second seat height P2 that differs from the first seat height P1.

Preferably, the first seat height P1 is higher than the second seat height P2. The second seat height P2 is, for example, the lowest height of the seat height P that can be obtained by the adjusting device 36. Preferably, the first seat height P1 is any seat height P other than the second seat height P2.

Preferably, the controller 72 controls the adjusting device 36 to adjust the seat height P of the human-powered vehicle 10 to the second seat height P2 if the human-powered vehicle 10 is being stopped while traveling uphill in a case where the seat height P is the first seat height P1, and the controller 72 then controls the adjusting device 36 to adjust the seat height P of the human-powered vehicle 10 to the first seat height P1 in a case where a traveling state of the human-powered vehicle is a first state. Preferably, the controller 72 determines that the traveling state of the human-powered vehicle 10 is the first state in a case where a change amount E of at least one of the vehicle speed V of the human-powered vehicle 10, the cadence C of the human-powered vehicle 10, and the depression force H input to the human-powered vehicle 10 is less than or equal to a predetermined change amount EX. The predetermined change amount EX is, for example, set to a value used for determining whether the human-powered vehicle 10 is being stopped while traveling uphill and the traveling state is stable in a case where the traveling is resumed.

In a case where the controller 72 uses the vehicle speed V to detect the first state, the traveling state detector 46 includes the vehicle speed sensor 56. In a case where the controller 72 uses the cadence C to detect the first state, the traveling state detector 46 includes the crank rotation sensor 60. In a case where the controller 72 uses the depression force H to detect the first state, the traveling state detector 46 includes the torque sensor 54.

A process performed by the controller 72 to control the adjusting device 36 will now be described with reference to FIG. 3. In a case where electric power is supplied to the controller 72, the controller 72 starts the process from step S11 of the flowchart shown in FIG. 3. In a case where the process of the flowchart in FIG. 3 ends, the controller 72 repeats the process from step S11 in predetermined cycles until the supply of electric power stops.

In step S11, the controller 72 determines whether the human-powered vehicle 10 is traveling uphill. The controller 72 determines whether the human-powered vehicle 10 is traveling uphill, for example, using at least one of the first to fifth examples. In a case where the human-powered vehicle is not traveling uphill, the controller 72 ends the process. In a case where the human-powered vehicle 10 is traveling uphill, the controller 72 proceeds to step S12.

In step S12, the controller 72 determines whether the human-powered vehicle 10 is stopped. The controller 72 determines whether the human-powered vehicle 10 is stopped, for example, using at least one of the sixth to twelfth examples. In a case where the human-powered vehicle 10 is not stopped, the controller 72 returns to step S11. In a case where the human-powered vehicle 10 is stopped, the controller 72 proceeds to step S13.

In step S13, the controller 72 determines whether the seat height P is the first seat height P1. In a case where the seat height P is not the first seat height P1, the controller 72 ends the process. In a case where the seat height P is the first seat height P1, the controller 72 proceeds to step S14.

In step S14, the controller 72 controls the adjusting device 36 so that the seat height P becomes the second seat height P2 and then proceeds to step S15. Specifically, the controller 72 transmits the second seat height control signal to the adjusting device 36. In step S15, the controller 72 determines whether the traveling state of the human-powered vehicle 10 is the first state. In a case where the traveling state of the human-powered vehicle 10 is not the first state, the controller 72 executes step S15 again. In a case where the traveling state of the human-powered vehicle 10 becomes the first state, the controller 72 proceeds to step S16.

In step S16, the controller 72 controls the adjusting device 36 so that the seat height P becomes the first seat height P1 and then ends the process. Specifically, the controller 72 transmits the first seat height control signal to the adjusting device 36. In step S16, the controller 72 can control the adjusting device 36 so that the seat height P becomes the same as the first seat height P1 before controlling the adjusting device 36 in step S14. Alternatively, in step S16, the controller 72 can control the adjusting device 36 so that the seat height P becomes a first seat height P1 that differs from the first seat height P1 before controlling the adjusting device 36 in step S14.

The controller 72 of the present embodiment allows the seat height P to be changed to the second seat height P2 that is lower than the first seat height P1 in a case where the human-powered vehicle 10 is being stopped while traveling uphill. Thus, the rider can resume traveling of the human-powered vehicle 10 in a state in which the seat height P is low. In this manner, the seat 21 will not interfere with pedaling of the human-powered vehicle 10 by the rider.

The controller 72 of the present embodiment controls the adjusting device 36 to adjust the seat height P of the human-powered vehicle 10 to the second seat height P2 in a case where the human-powered vehicle 10 is being stopped while traveling uphill. Then, the controller 72 can change the seat height P to the first seat height P1 that is higher than the second seat height P2 in a case where the traveling state becomes a second state. This allows the rider pedaling the human-powered vehicle 10 to be seated on the seat 21.

Second Embodiment

The control device 70 in accordance with a second embodiment will now be described with reference to FIGS. 2 and 4. The control device 70 of the second embodiment is configured in the same manner as the control device 70 of the first embodiment except in that the process illustrated in FIG. 4 is performed instead of the process illustrated in FIG. 3. Thus, same reference numerals are given to those components that are the same as the corresponding components of the first embodiment and such components will not be described in detail.

The controller 72 controls the adjusting device 36 so that the seat height P of the human-powered vehicle 10 becomes the second seat height P2 if the human-powered vehicle 10 is being stopped while traveling uphill in a case where the seat height P is the first seat height P1, and the controller 72 then controls the adjusting device 36 to adjust the seat height P of the human-powered vehicle 10 to the first seat height P1 in a case where a traveling state of the human-powered vehicle is a second state.

Preferably, the controller 72 determines that the traveling state of the human-powered vehicle 10 is the second state in a case where the controller detects at least one of rotation of the crank 12 of the human-powered vehicle 10 and input of the depression force H to the human-powered vehicle 10. Preferably, the second state corresponds to resumed traveling of the human-powered vehicle 10. The controller 72 determines that the traveling state of the human-powered vehicle 10 is the second state, for example, in at least one of cases where the cadence C becomes greater than a predetermined cadence CY and where the depression force H becomes greater than a predetermined depression force HY. The predetermined cadence CY is, for example, 0 rpm. The predetermined depression force HY is, for example, 0 Nm.

In a case where the controller 72 uses the rotation of the crank 12 to detect the second state, the traveling state detector 46 includes the crank rotation sensor 60. In a case where the controller 72 uses the depression force H to detect the second state, the traveling state detector 46 includes the torque sensor 54.

Preferably, the controller 72 controls the adjusting device 36 to adjust the seat height P of the human-powered vehicle 10 to the second seat height P2 in a case where the controller 72 determines that the traveling state of the human-powered vehicle 10 is a third state after determining that the traveling state of the human-powered vehicle 10 is the second state.

Preferably, the controller 72 determines that traveling state of the human-powered vehicle 10 is the third state in a case where the rotational speed WA of the rear wheel 14A of the human-powered vehicle 10 is greater than the rotational speed WB of the front wheel 14B of the human-powered vehicle 10 by a predetermined speed WX or greater. Preferably, the third state corresponds to a slipping state in a case where traveling of the human-powered vehicle 10 is resumed. Preferably, the predetermined speed WX is a value corresponding to the slipping state of the human-powered vehicle 10 while traveling uphill.

In a case where the controller 72 uses the rotational speed WA of the rear wheel 14A and the rotational speed WB of the front wheel 14B to detect the second state, the traveling state detector 46 includes the vehicle speed sensor 56 provided on the front wheel 14B and the vehicle speed sensor 56 provided on the rear wheel 14A.

A process performed by the controller 72 to control the adjusting device 36 will now be described with reference to FIG. 4. In a case where electric power is supplied to the controller 72, the controller 72 starts the process from step S21 of the flowchart shown in FIG. 4. In a case where the process of the flowchart in FIG. 4 ends, the controller 72 repeats the process from step S21 in predetermined cycles until the supply of electric power stops.

In step S21, the controller 72 determines whether the human-powered vehicle 10 is traveling uphill. The controller 72 determines whether the human-powered vehicle 10 is traveling uphill, for example, using at least one of the first to fifth examples. In a case where the human-powered vehicle is not traveling uphill, the controller 72 ends the process. In a case where the human-powered vehicle 10 is traveling uphill, the controller 72 proceeds to step S22.

In step S22, the controller 72 determines whether the human-powered vehicle 10 is stopped. The controller 72 determines whether the human-powered vehicle 10 is stopped, for example, using at least one of the sixth to twelfth examples. In a case where the human-powered vehicle 10 is not stopped, the controller 72 returns to step S21. In a case where the human-powered vehicle 10 is stopped, the controller 72 proceeds to step S23.

In step S23, the controller 72 determines whether the seat height P is the first seat height P1. In a case where the seat height P is not the first seat height P1, the controller 72 proceeds to step S27. In a case where the seat height P is the first seat height P1, the controller 72 proceeds to step S24.

In step S24, the controller 72 controls the adjusting device 36 so that the seat height P becomes the second seat height P2 and then proceeds to step S25. Specifically, the controller 72 transmits the second seat height control signal to the adjusting device 36. In step S25, the controller 72 determines whether the traveling state of the human-powered vehicle 10 is the second state. In a case where the traveling state of the human-powered vehicle 10 is not the second state, the controller 72 executes step S25 again. In a case where the traveling state of the human-powered vehicle 10 becomes the second state, the controller 72 proceeds to step S26.

In step S26, the controller 72 controls the adjusting device 36 so that the seat height P becomes the first seat height P1 and then proceeds to step S27. Specifically, the controller 72 transmits the first seat height control signal to the adjusting device 36. In step S26, the controller 72 can control the adjusting device 36 so that the seat height P becomes the same as the first seat height P1 before controlling the adjusting device 36 in step S24. Alternatively, the controller 72 can control the adjusting device 36 so that the seat height P becomes a first seat height P1 that differs from the first seat height P1 before controlling the adjusting device 36 in step S24.

In step S27, the controller 72 determines whether the traveling state of the human-powered vehicle 10 is the third state. In a case where the traveling state of the human-powered vehicle 10 is not the third state, the controller 72 ends the process. In a case where the traveling state of the human-powered vehicle 10 is the third state, the controller 72 proceeds to step S28. In step S28, the controller 72 controls the adjusting device 36 so that the seat height P becomes the second seat height P2 and then ends the process. Specifically, the controller 72 transmits the second seat height control signal to the adjusting device 36.

The controller 72 of the present embodiment controls the adjusting device 36 to adjust the seat height P of the human-powered vehicle 10 to the first seat height P1. Then, the controller 72 can change the seat height P to the second seat height P2 that is higher than the first seat height P1 in a case where the traveling state becomes the third state. Thus, in a case where the rider wishes to resume traveling of the human-powered vehicle 10, the rider pedaling the human-powered vehicle 10 can be seated on the seat 21.

Modifications

The description related with the above embodiments exemplifies, without any intention to limit, an applicable form of a human-powered vehicle control device according to the present disclosure. In addition to the embodiments described above, the human-powered vehicle control device according to the present disclosure is applicable to, for example, modifications of the above embodiments that are described below and combinations of at least two of the modifications that do not contradict each other. In the modifications described hereafter, same reference numerals are given to those components that are the same as the corresponding components of the above embodiments and such components will not be described in detail.

In the process of the second embodiment illustrated in FIG. 4, steps S27 and S28 can be omitted.

Figure 4:
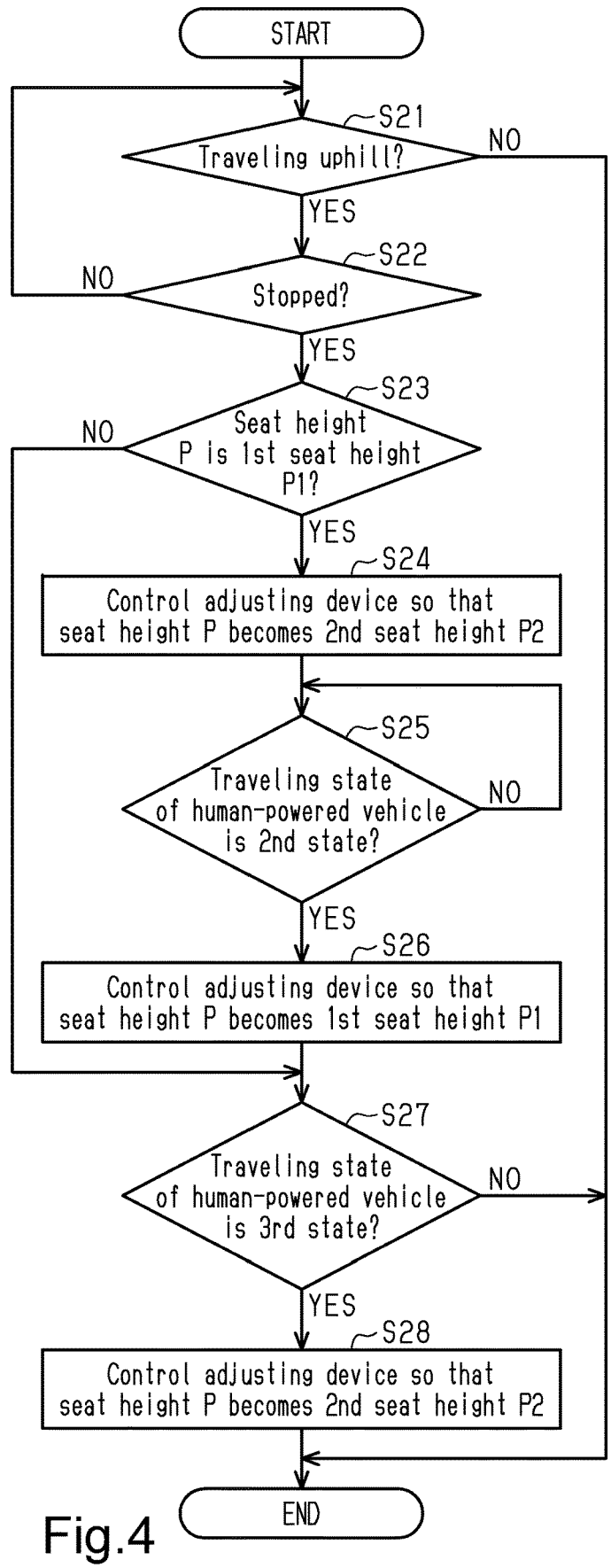
FIG. 4 is a flowchart illustrating a process performed by an electronic controller in accordance with a second embodiment to control an adjusting device.
Figure 5:
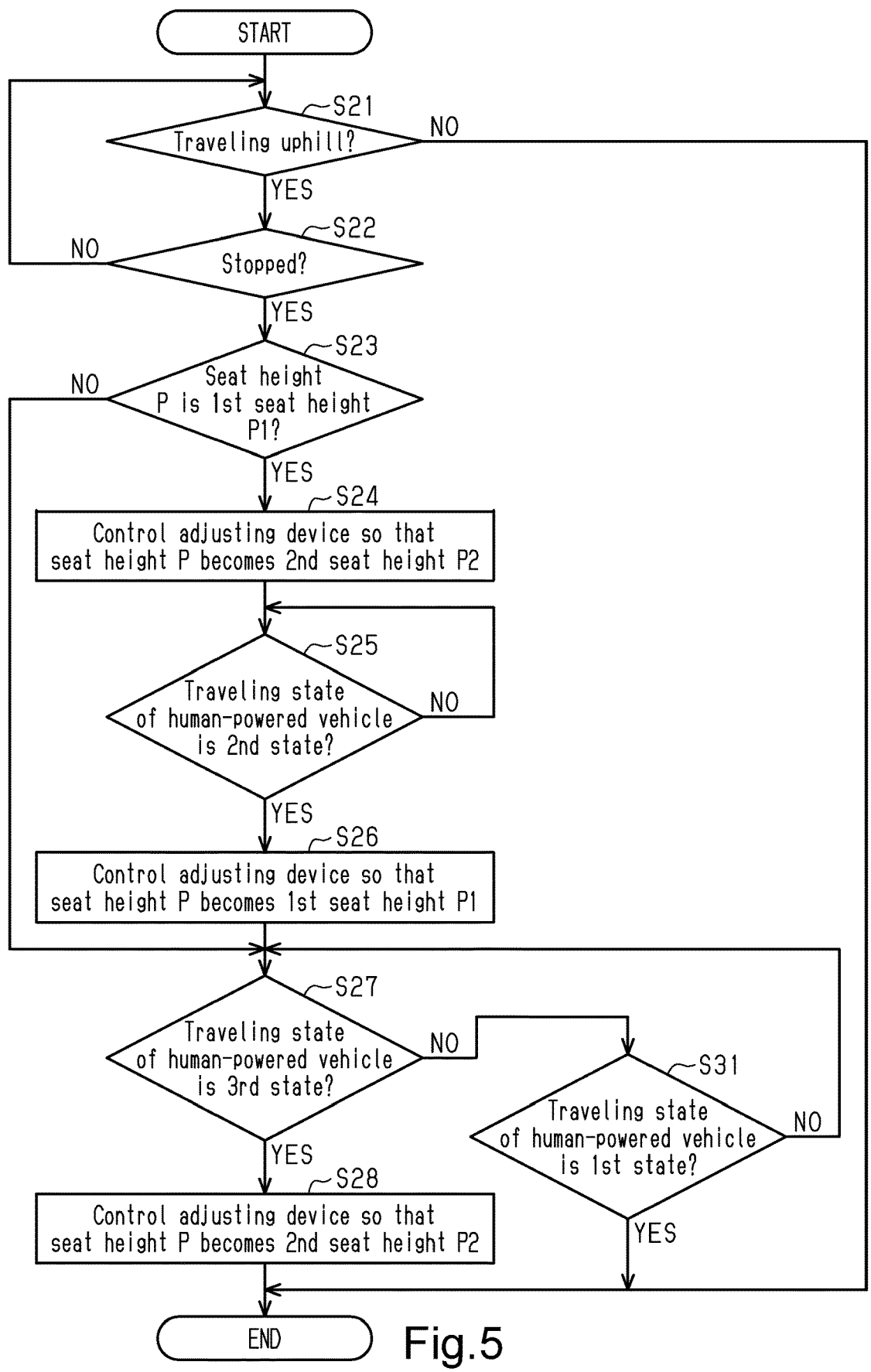
FIG. 5 is a flowchart illustrating a process performed by an electronic controller in accordance with one modification to control an adjusting device.

In the process of the second embodiment illustrated in FIG. 4, the controller 72 can end the process in a case where the controller 72 determines that the traveling state of the human-powered vehicle 10 is the second state and the controller 72 then determines that the traveling state of the human-powered vehicle 10 is the first state. For example, the process of FIG. 4 is changed to the process of FIG. 5. In step S27 of FIG. 5, in a case where the traveling state of the human-powered vehicle 10 is not the third state, the controller 72 proceeds to step S31. In step S31, the controller 72 determines whether the traveling state of the human-powered vehicle 10 is the first state. In a case where the traveling state of the human-powered vehicle 10 is the first state, the controller 72 ends the process. In a case where the traveling state of the human-powered vehicle 10 is not the first state, the controller 72 returns to step S27.

Figure 3:
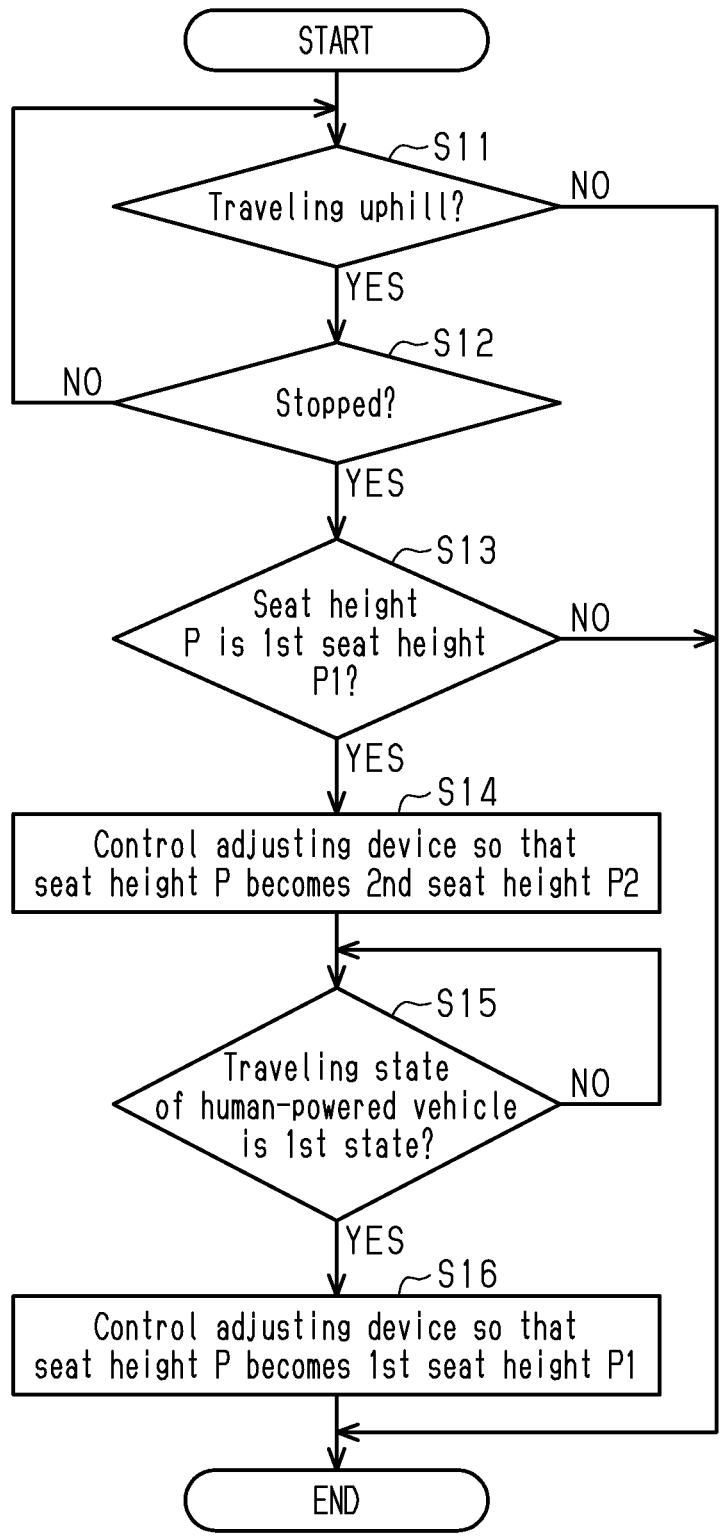
FIG. 3 is a flowchart illustrating a process performed by an electronic controller in FIG. 2 to control an adjusting device.

In the process of the first embodiment illustrated in FIG. 3, step S13 can be omitted. In this case, in a case where a YES determination is given in step S12, the controller 72 proceeds to step S14. In the modification, for example, in a case where the human-powered vehicle 10 is being stopped while traveling uphill, the controller 72 transmits the second seat height control signal so that the seat height P becomes the second seat height P2 regardless of the present seat height P.

In the first embodiment, the controller 72 can determine that the traveling state of the human-powered vehicle 10 is the first state in a case where the load LB on the front wheel support axle 14Y is less than the load LA on the rear wheel support axle 14X, or the load LB on the front wheel support axle 14Y is greater than the load LA on the rear wheel support axle 14X.

In the process of the second embodiment illustrated in FIG. 4, step S23 can be omitted. In this case, in a case where a YES determination is given in step S22, the controller 72 proceeds to step S24. In the modification, for example, in a case where the human-powered vehicle 10 is being stopped while traveling uphill, the controller 72 transmits the second seat height control signal so that the seat height P becomes the second seat height P2 regardless of the present seat height P.

In the second embodiment, the controller 72 can determine that the traveling state of the human-powered vehicle 10 is the third state in a case where the load LA on the rear wheel support axle 14X decreases, a case where the depression force H falls, a case where the rotational speed WB of the front wheel 14B increases from 0 kilometers per hour to, for example, 5 kilometers per hour and then decreases, and a case where the cadence C increases and then decreases.

In each embodiment, in a case where the human-powered vehicle 10 is being stopped while traveling uphill, the controller 72 can transmit the seat height control signal to control the adjusting device 36 so that the seat height P is lowered. In a case where the seat height P is the lowest seat height P, the controller 72 does not have to transmit the seat height control signal to the adjusting device 36.

The controller 72 can control the adjusting device 36 to lower the seat height P without determining the seat height P. In this modification, step S13 of the first embodiment and step S23 of the second embodiment are omitted. In this modification, the human-powered vehicle 10 does not have to include a seat height detector. In a case where the actuator 38 is configured to switch between the state allowing relative movement of the first member 40A and the second member 40B and the state restricting relative movement of the first member 40A and the second member 40B, if the human-powered vehicle 10 is being stopped while traveling uphill, the controller 72 transmits the seat height control signal to the adjusting device 36 to switch to the state allowing relative movement of the first member 40A and the second member 40B. In a case where the first communication unit 44 receives the seat height control signal, the controller 72 switches to the state allowing relative movement of the first member 40A and the second member 40B to the adjusting device 36. For example, the first controller 42 switches to the state restricting relative movement of the first member 40A and the second member 40B in a case where a predetermined period of time elapses after switching to the state allowing relative movement of the first member 40A and the second member 40B. In this modification, it is preferred that the second seat height P2 be the lowest seat height P that can be obtained by the adjusting device 36.

In each embodiment, the second seat height P2 can be set to be higher than the first seat height P1. In this case, for example, in a case where the human-powered vehicle 10 is being stopped while traveling uphill, the seat height P is increased so that the rider can hold the seat 21 and easily walk the human-powered vehicle 10.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

What is claimed is:

1. A control device for a human-powered vehicle, the control device comprising:
   an electronic controller configured to determine whether the human-powered vehicle is traveling uphill and whether the human-powered vehicle is being stopped,
   the electronic controller being configured to control an adjusting device that is configured to adjust a seat height of the human-powered vehicle according to determining that the human-powered vehicle is being stopped in a state where the human-powered vehicle is facing an uphill direction.

2. The control device according to claim 1, wherein the electronic controller is configured to control the adjusting device to adjust the seat height from a first seat height to a second seat height that differs from the first seat height upon determining the human-powered vehicle is being stopped while traveling uphill where the seat height is the first seat height.

3. The control device according to claim 2, wherein the first seat height is higher than the second seat height.

4. The control device according to claim 2, wherein the electronic controller is configured to control the adjusting device to adjust the seat height of the human-powered vehicle to the second seat height upon determining the human-powered vehicle is being stopped while traveling uphill where the seat height is the first seat height, and
   the electronic controller then is configured to control the adjusting device to adjust the seat height of the human-powered vehicle to the first seat height upon the electronic controller determining that a traveling state of the human-powered vehicle is a first state.

5. The control device according to claim 4, wherein the electronic controller is configured to determine that the traveling state of the human-powered vehicle is the first state where a change amount of at least one of a vehicle speed of the human-powered vehicle, a cadence of the human-powered vehicle, and a depression force input to the human-powered vehicle is less than or equal to a predetermined change amount.

6. The control device according to claim 2, wherein the electronic controller is configured to control the adjusting device to adjust the seat height of the human-powered vehicle to the second seat height upon determining the human-powered vehicle is being stopped while traveling uphill where the seat height is the first seat height, and
   the electronic controller then is configured to control the adjusting device to adjust the seat height of the human-powered vehicle to the first seat height upon the electronic controller determining that a traveling state of the human-powered vehicle is a second state.

7. A control device for a human-powered vehicle, the control device comprising:
   an electronic controller configured to control an adjusting device that is configured to adjust a seat height of the human-powered vehicle from a first seat height to a second seat height that differs from the first seat height upon determining the human-powered vehicle is being stopped while traveling uphill where the seat height is the first seat height, the electronic controller then being configured to control the adjusting device to adjust the seat height of the human-powered vehicle to the first seat height upon the electronic controller determining that a traveling state of the human-powered vehicle is a second state, the electronic controller being configured to determine that the traveling state of the human-powered vehicle is the second state upon the electronic controller detecting at least one of a rotation of a crank of the human-powered vehicle and an input of a depression force to the human-powered vehicle.

8. The control device according to claim 6, wherein the electronic controller is configured to control the adjusting device to adjust the seat height of the human-powered vehicle to the second height upon the electronic controller determining that the traveling state of the human-powered vehicle is a third state after determining that the traveling state of the human-powered vehicle is the second state.

9. A control device for a human-powered vehicle, the control device comprising:
an electronic controller configured to control an adjusting device that is configured to adjust a seat height of the human-powered vehicle from a first seat height to a second seat height that differs from the first seat height upon determining the human-powered vehicle is being stopped while traveling uphill where the seat height is the first seat height, the electronic controller then being configured to control the adjusting device to adjust the seat height of the human-powered vehicle to the first seat height upon the electronic controller determining that a traveling state of the human-powered vehicle is a second state, the electronic controller being configured to control the adjusting device to adjust the seat height of the human-powered vehicle to the second height upon the electronic controller determining that the traveling state of the human-powered vehicle is a third state after determining that the traveling state of the human-powered vehicle is the second state, the electronic controller being configured to determine that the traveling state of the human-powered vehicle is the third state upon determining a rotational speed of a rear wheel of the human-powered vehicle is higher than a rotational speed of a front wheel of the human-powered vehicle by a predetermined speed or greater.

10. The control device according to claim 2, wherein the adjusting device includes an actuator, and
the electronic controller is configured to transmit a first seat height control signal to the adjusting device to actuate the actuator so that the seat height of the human-powered vehicle becomes the first seat height.

11. The control device according to claim 2, wherein the adjusting device includes an actuator, and
the electronic controller is configured to transmit a second seat height control signal to the adjusting device to actuate the actuator so that the seat height of the human-powered vehicle becomes the second seat height.

12. A control device for a human-powered vehicle, the control device comprising:
an electronic controller configured to control an adjusting device that is configured to adjust a seat height of the human-powered vehicle upon determining the human-powered vehicle is being stopped while traveling uphill, the controller being configured to determine that the human-powered vehicle is being stopped while traveling uphill based on traveling information of the human-powered vehicle, and the traveling information including at least one of an inclination with respect to a pitch direction of the human-powered vehicle, a load on a front wheel support axle, a load on a rear wheel support axle, an input depression force, a vehicle speed, a rotational speed of a front wheel, a rotational speed of a rear wheel, a cadence of a rider, and a seated state of the rider.

* * * * *